(12) United States Patent
Lindley

(10) Patent No.: US 8,322,946 B2
(45) Date of Patent: Dec. 4, 2012

(54) AUTOMATICALLY ADJUSTABLE ROLLING SCREED

(76) Inventor: Joseph W. Lindley, Paducah, KY (US)

( * ) Notice: Subject to any disclaimer, the term of this patent is extended or adjusted under 35 U.S.C. 154(b) by 283 days.

(21) Appl. No.: 12/691,305

(22) Filed: Jan. 21, 2010

(65) Prior Publication Data
US 2010/0183369 A1 Jul. 22, 2010

Related U.S. Application Data

(60) Provisional application No. 61/146,589, filed on Jan. 22, 2009, provisional application No. 61/154,240, filed on Feb. 20, 2009, provisional application No. 61/184,692, filed on Jun. 5, 2009.

(51) Int. Cl.
 *E01C 19/22* (2006.01)
(52) U.S. Cl. ...................... 404/84.5; 404/118
(58) Field of Classification Search ................. 404/84.1, 404/84.5, 118
See application file for complete search history.

(56) References Cited

U.S. PATENT DOCUMENTS

| | | | |
|---|---|---|---|
| 4,437,828 A | 3/1984 | Egger | |
| 4,544,346 A | 10/1985 | Allen | |
| 4,659,054 A | 4/1987 | Allen | |
| 4,913,582 A | 4/1990 | Barrett | |
| 5,567,075 A | 10/1996 | Allen | |
| 6,089,787 A * | 7/2000 | Allen et al. | 404/118 |
| 6,685,390 B1 | 2/2004 | Eitzen | |
| 6,709,194 B1 | 3/2004 | Grimes | |
| 6,866,445 B2 | 3/2005 | Semler | |
| 6,953,304 B2 * | 10/2005 | Quenzi et al. | 404/114 |
| 6,976,805 B2 * | 12/2005 | Quenzi et al. | 404/114 |
| 6,981,819 B1 | 1/2006 | Suckow et al. | |
| 7,121,762 B2 * | 10/2006 | Quenzi et al. | 404/84.1 |
| 7,195,423 B2 * | 3/2007 | Halonen et al. | 404/84.5 |
| 7,293,938 B1 | 11/2007 | Suckow et al. | |
| 7,320,558 B2 * | 1/2008 | Quenzi et al. | 404/75 |
| 7,407,339 B2 | 8/2008 | Halonen et al. | |
| 7,491,011 B2 * | 2/2009 | Quenzi et al. | 404/84.1 |
| 7,850,396 B2 * | 12/2010 | Pietila et al. | 404/96 |
| 7,854,565 B2 * | 12/2010 | Halonen et al. | 404/75 |
| 7,909,533 B2 * | 3/2011 | Quenzi et al. | 404/114 |
| 8,038,366 B2 * | 10/2011 | Halonen et al. | 404/118 |
| 2002/0154948 A1 | 10/2002 | Brabee et al. | |
| 2003/0108390 A1 | 6/2003 | Carlson | |
| 2004/0028473 A1 | 2/2004 | Craghan | |
| 2004/0071509 A1 | 4/2004 | Frankeny, II | |
| 2006/0018714 A1 | 1/2006 | Rouillard | |
| 2006/0045625 A1 | 3/2006 | Sina | |
| 2006/0120801 A1 * | 6/2006 | Johnson | 404/118 |
| 2006/0198700 A1 | 9/2006 | Maier et al. | |
| 2007/0116520 A1 | 5/2007 | Quenzi et al. | |
| 2007/0127985 A1 | 6/2007 | Halonen et al. | |
| 2007/0140792 A1 | 6/2007 | Quenzi et al. | |
| 2007/0154260 A1 | 7/2007 | Lindley | |
| 2007/0166104 A1 | 7/2007 | Face, III | |
| 2007/0292208 A1 | 12/2007 | Lutz et al. | |
| 2008/0031687 A1 | 2/2008 | Frankeny | |
| 2008/0031689 A1 | 2/2008 | Face et al. | |
| 2008/0131205 A1 | 6/2008 | Quenzi et al. | |

* cited by examiner

*Primary Examiner* — Gary S Hartmann
(74) *Attorney, Agent, or Firm* — Barnes & Thornburg LLP

(57) ABSTRACT

A material leveling system includes a leveling-implement assembly adapted for leveling material to a final grade level, a frame supporting the leveling-implement assembly, and an implement positioning assembly controlling the position of the leveling-implement assembly relative to the frame. The leveling-implement assembly includes an implement that contacts a construction material during the leveling process.

11 Claims, 12 Drawing Sheets

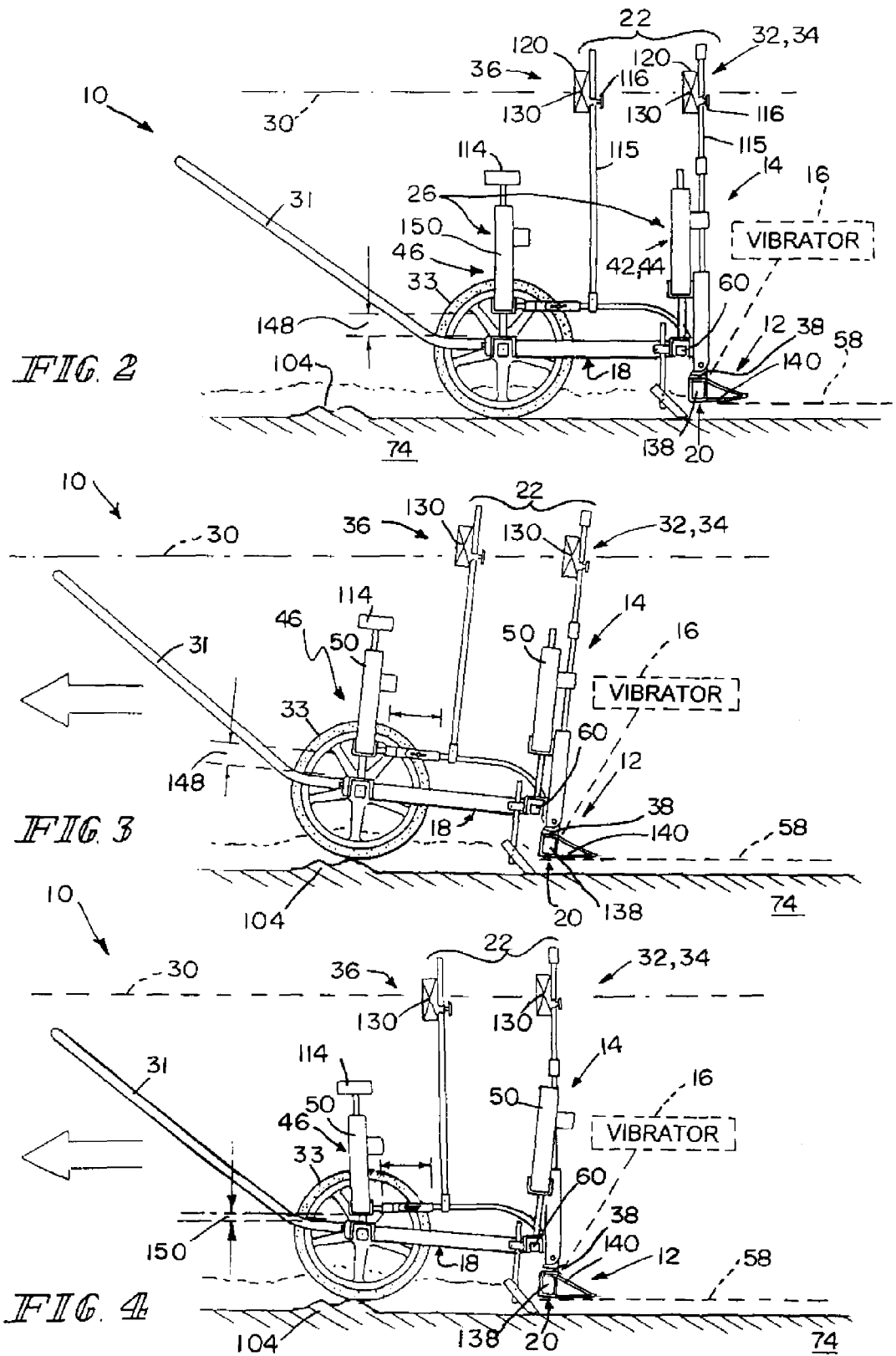

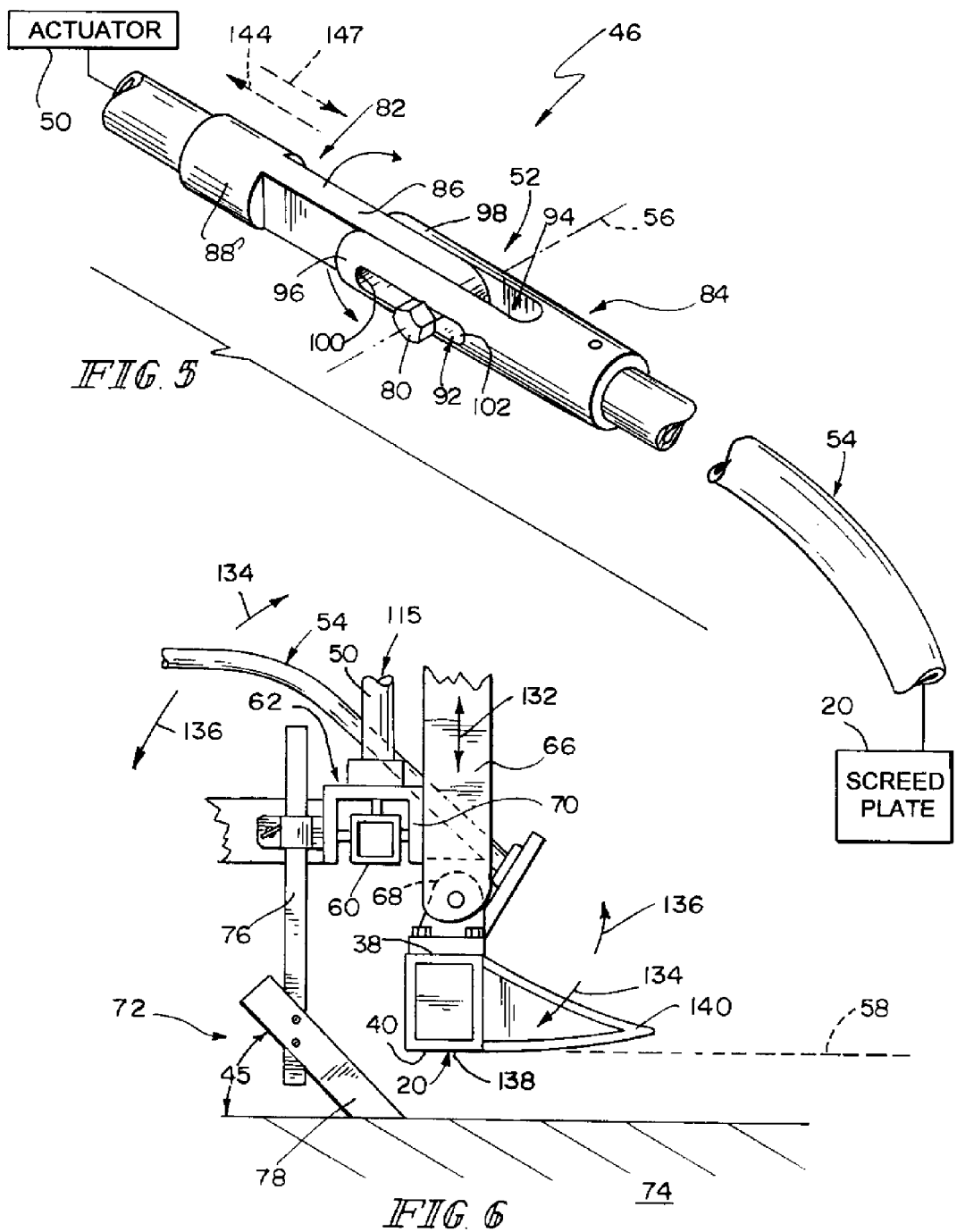

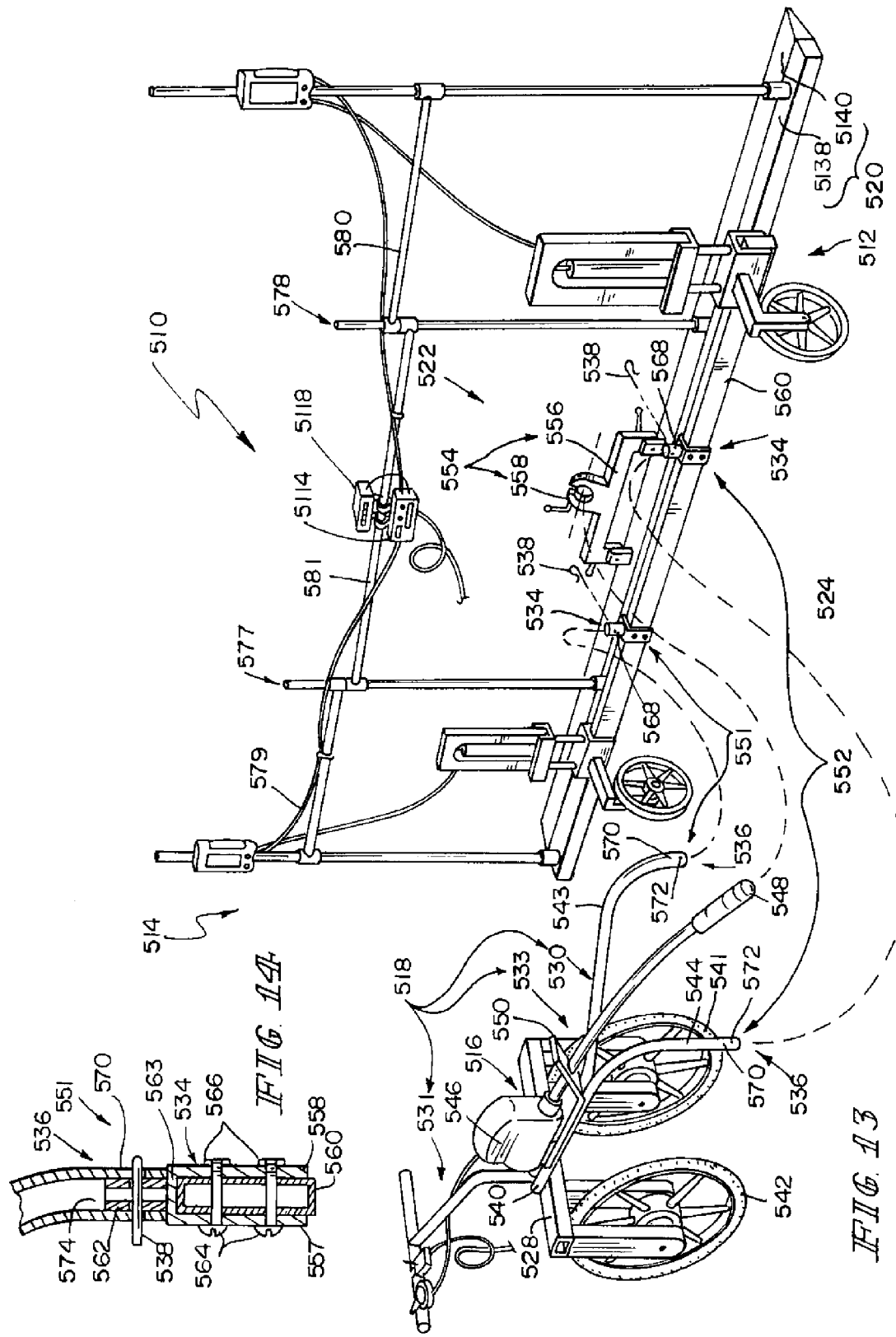

AUTOMATICALLY ADJUSTABLE ROLLING SCREED

This application claims priority under 35 U.S.C. §119(e) to U.S. Provisional Application Ser. Nos. 61/146,589, filed Jan. 22, 2009; 61/154,240, filed Feb. 20, 2009; and 61/184,692 filed Jun. 5, 2009, each of which is expressly incorporated by reference herein.

BACKGROUND

The present disclosure is related to a movable implement for leveling construction material in a work area. More specifically, the present disclosure is related to a movable implement with automatic height adjustment for establishing a grade level of the construction material in the work area.

Various construction materials including sand, gravel, dirt, wet concrete and the like are positioned at a work area in bulk. Such construction materials must be spread over the work area to place the construction materials at the required grade. Spreading of construction materials to the proper grade can be a tedious and labor intensive process when performed by hand.

SUMMARY

According to the present disclosure, a material leveling system includes a leveling-implement assembly adapted for leveling material to a final grade level. The leveling-implement assembly includes an implement and a frame configured to support the implement during the leveling process.

According to the present disclosure, a material-leveling system comprises a material-leveling assembly including a mobile-support frame and a material-leveling implement coupled to the mobile-support frame to move with the mobile-support frame relative to ground. The material-leveling system further comprises an automatic-leveling system including means for controlling movement of the material-leveling implement relative to a reference plane established by a grade laser so that a final-grade level of material is established in response to the material-leveling assembly moving through a work area.

In illustrative embodiments, the automatic-leveling system includes an implement-positioning system arranged to interconnect the material-leveling implement and the mobile-support frame to cause the material-leveling implement to move relative to the mobile-support frame. A sensor system is coupled to the material-leveling implement to move therewith and configured to sense the grade laser. A control system interconnects the sensor system and the implement-positioning system to cause position signals received from the sensor system to be converted into movement commands that cause the material-leveling implement to move so that the final grade level is established in the work area.

In illustrative embodiments, the sensor system includes a first vertical-position receiver unit coupled to the material-leveling implement and a second vertical-position receiver unit coupled to the material-leveling implement in spaced-apart relation to the first vertical-position receiver unit. The first and second vertical-position receiver units are arranged to extend in an upward direction away from the material-leveling implement.

In illustrative embodiments, the implement-positioning system includes first and second height-adjustment mechanisms coupled the material-leveling implement to move up-and-down relative to the mobile-support frame and the material-leveling implement is coupled to the first and second height-adjustment mechanisms to move therewith.

In illustrative embodiments, the sensor system further includes a rotational-position unit coupled to the implement-positioning system to move therewith and spaced-apart from the first and second vertical-position receivers units to cause a rotational position of the material-leveling implement to be sensed by the sensor system.

In illustrative embodiments, the implement-positioning system includes a rotation-adjustment mechanism arranged to interconnect the material-leveling implement to the mobile-support frame to cause the material-leveling implement to move about an axis of rotation relative to the mobile-support frame.

In illustrative embodiments, the material-leveling implement includes a screed plate configured to remove excess uncured concrete from the work area to provide the final-grade level and to smooth concrete and a vibrator coupled to the screed plate to impart vibrations into the screed plate to work the concrete.

In illustrative embodiments, the material-leveling implement is a material rake adapted to move excess material from the work area to provide the final-grade level.

In illustrative embodiments, the material-leveling implement includes an auger and a power source coupled to the auger to cause an auger blade to rotate about an auger-rotation axis relative to the mobile-support frame. The power source includes a motor having a rotational output configured to rotate about an axis of rotation and a rotary transmitter configured to transmit the rotational output of the motor to the auger. The auger-rotation axis is positioned to lie in spaced-apart generally parallel relation below the axis of rotation of the rotational output.

In illustrative embodiments, the mobile-support frame further includes a frame-implement coupler configured to provide means for separating selectively the mobile-support frame and the material-leveling implement without tools and for coupling selectively without tools the mobile-support fame and the material-leveling implant to establish a useable configuration of the material-leveling system. The frame-implement coupler may include first and second mount arms, each of the first and second mount arms has a first end coupled to the mobile-support frame in a fixed position relative to the mobile support frame and an opposite second end. First and second mount-arm receivers may be coupled to the material-leveling implement in spaced-apart relation to one another in a fixed position. The first and second mount-arm receivers may be configured to mate with and receive the associated first and second mount arms to cause the material-leveling implement to move in response to movement of the mobile-support frame.

In another aspect of the present disclosure, a material-leveling system comprises a material-leveling assembly including a wheel assembly, a handle coupled to a first end of the wheel assembly, and a material-leveling implement coupled to the wheel assembly to move relative to the wheel assembly and an automatic-leveling system. The automatic leveling system includes a sensor system, an implement-positioning system, and a control system.

In illustrative embodiments, the sensor system includes first and second vertical-position receiver units and a rotational-position unit. The first and second vertical-position receiver units are coupled to the material-leveling implement to move therewith and arranged to extend in an upward direction away from ground to sense a vertical position of the material-leveling implement relative to a reference plane defined by a grade laser. The rotational-position unit is positioned to lie in spaced-apart relation to the vertical-position receiver units to sense a rotational position of the material-leveling implement relative to the reference plane.

In illustrative embodiments, the implement-positioning system includes first and second height-adjustment mechanisms arranged to interconnect the material-leveling implement to the wheel assembly and a rotation-adjustment mechanism. The first and second height-adjustment mechanisms cause the material-leveling implement to move up-and-down relative to the reference plane so that the material-leveling implement assumes a final-grade producing position. The rotation-adjustment mechanism is arranged to interconnect the material-leveling implement to the wheel assembly to cause the material-leveling implement to rotate about an axis of rotation relative to the reference plant so that material-leveling implement assumes the final-grade producing position.

In illustrative embodiments, the control system is connected to the first and second vertical-position receiver units and the rotational-position unit to receive at least one position signal sent from at least one of the first and second vertical-position receiver units and the rotational-position unit. The control system is connected to the first and second height-adjustment mechanisms and the rotation-adjustment mechanism to send at least one control signal to at least one of the first and second height-adjustment mechanisms and rotation-adjustment mechanism to move the material-leveling implement to the final-grade producing position.

In illustrative embodiments, the rotation-adjustment mechanism includes an actuator coupled to the wheel assembly for movement relative to the wheel assembly, an implement-rotation bracket coupled to the material-leveling implement to move therewith, and a rotation pivot configured to provide means for allowing the implement-rotation bracket to pivot about a pivot axis relative to the actuator and to translate back and forth relative to the actuator during up-and-down movement of the actuator relative to the wheel assembly.

In illustrative embodiments, the rotation pivot further includes a rotation axle defining the pivot axis, an axle mount coupled to the actuator to move therewith, and an axle-mount receiver coupled to the implement-rotation bracket to move therewith, the axle-mount receiver is formed to include an axle-mount channel configured to receive the axle mount therein and formed to include an a first pivot-axle slot configured to open into the axle-mount channel and an opposite second pivot-axle slot configure to open into the axle-mount channel.

According to yet another aspect of the present disclosure, a material-leveling system comprises a material-leveling assembly including a wheel assembly, a handle coupled to a first end of the wheel assembly, and a material-leveling implement coupled to the wheel assembly to move relative to the wheel assembly. The material leveling system also includes means for controlling the pitch of the material-leveling implement to cause the material-leveling implement to be maintained at a pitch in a final-grade producing position.

In illustrative embodiments, the means for controlling the pitch of the material-leveling implement comprises an implement-positioning system including a rotation-adjustment mechanism arranged to interconnect the material-leveling implement to the wheel assembly to cause the material-leveling implement to rotate about an axis of rotation relative to the reference plane so that the pitch of the material-leveling implement assumes a final-grade producing position. The means for controlling the pitch of the material leveling implement also comprises a control system connected to the rotation-adjustment mechanism to send at least one control signal to the rotation-adjustment mechanism to adjust the pitch of the material-leveling implement to the final-grade producing position.

In illustrative embodiments, the means for controlling the pitch of the material-leveling implement comprises an actuator coupled to the wheel assembly for movement relative to the wheel assembly, an implement-rotation bracket coupled to the material-leveling implement to move therewith, and a rotation pivot configured to provide means for allowing the implement-rotation bracket to pivot about a pivot axis relative to the actuator and to translate back and forth relative to the actuator during up-and-down movement of the actuator relative to the wheel assembly.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIGS. 2-4 show an illustrative process by which the automatic leveling system uses a pair of height-adjustment mechanisms (actuators) to control the height of the screed plate relative to a rough grade below and a rotation-adjustment mechanism (actuator) to adjust the screed-plate pitch so that the screed plate remains at the final grade level;

FIG. 2 is a side elevation view of the material leveling system of FIG. 1 showing the illustrative screed system operating on a rough grade level and showing that the automatic leveling system has worked the uncured concrete to the final grade level to the right of the screed plate as the screed assembly moves to the left;

FIG. 3 is a view similar to FIG. 2 showing the screed system moved onto a bump in the rough grade causing the screed plate pitch to alter and suggesting that a sensor system included in the automatic leveling system detects a misalignment of a laser signal causing the control system to actuate the height-adjustment mechanisms and the rotation-adjustment mechanism to cause the screed plate of the screed system to return to the final grade level with the screed plate at the proper pitch as suggested in FIG. 4;

FIG. 4 is a view similar to FIG. 3 showing the screed system after the automatic leveling system has adjusted the screed plate to achieve the final grade level while the screed assembly remains on the bump formed in the rough grade;

FIG. 5 is an enlarged partial perspective view of the rotation-adjustment mechanism showing that the rotation-adjustment mechanism includes, from left-to-right, an actuator, a rotation pivot, and a screed-plate bracket interconnecting the rotation pivot to the screed plate and suggesting that the rotation pivot is configured for rotational movement (solid arrows) and translational movement (phantom arrows);

FIG. 6 is an enlarged partial elevation view of leveling-implement assembly, illustratively the screed assembly of FIG. 1 suggesting that the screed plate is configured to pivot about a pivot axis established by a support pivot interconnecting the screed plate to a height-adjustment mechanism included in the automatic leveling system and showing that the distance between the rough grade and the frame is controlled by a support-bar guide coupled to the frame behind the screed plate;

FIG. 13 is an exploded perspective view of the screed system of FIG. 12 showing the detachable frame removed from the screed unit to allow easier transportation of the screed assembly;

FIG. 14 is a sectional view taken about line 14-14 of FIG. 12 showing a frame coupler operating to interconnect the detachable frame and the screed unit;

DETAILED DESCRIPTION

Figure 9:
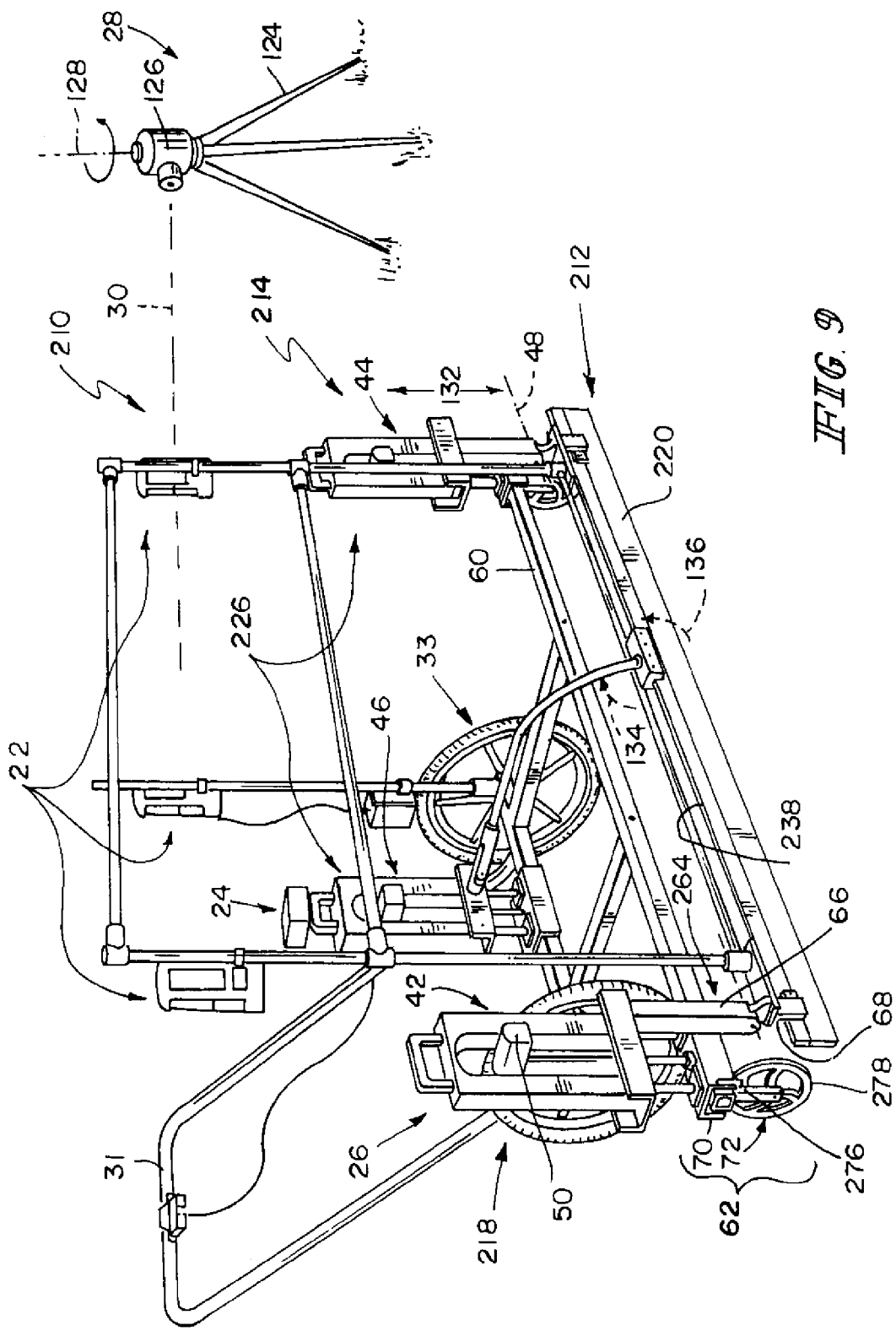
FIG. 9 is a perspective view of another embodiment of a material leveling system in accordance with the present disclosure, showing that the material leveling system includes a rake assembly adapted for removing excess material from a work area and an automatic leveling system that includes two vertical-position receivers and one rotational-position receiver to control a rake plate included in the rake assembly by changing the vertical and rotational position of the rake plate so that a final grade level of material is obtained during the raking process.
Figure 10:
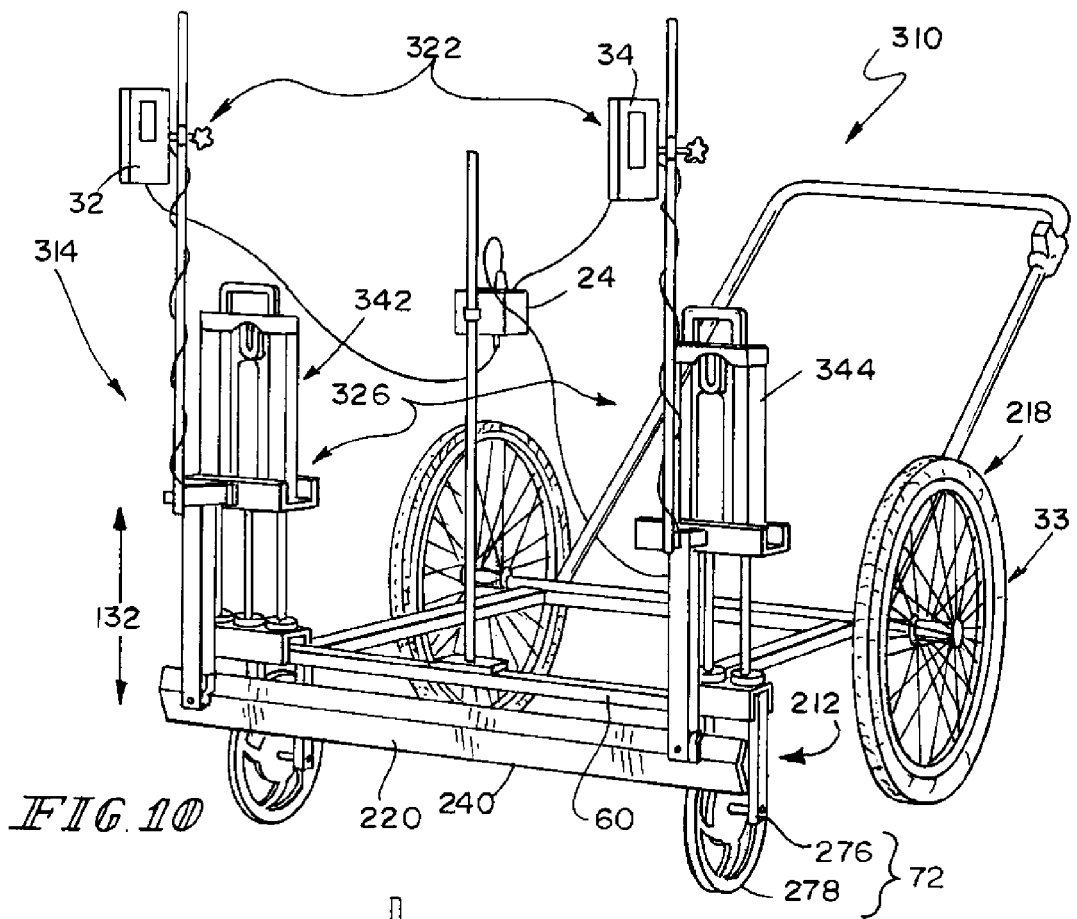
FIG. 10 is a perspective view of another embodiment of a material leveling system in accordance with the present disclosure, showing the material leveling system includes a rake assembly including an automatic leveling system that includes a first and a second vertical-position receiver configured to control companion height-adjustment mechanisms to alter the vertical position of the rake bar so that a final grade level of material is produced during the raking process.
Figure 12:
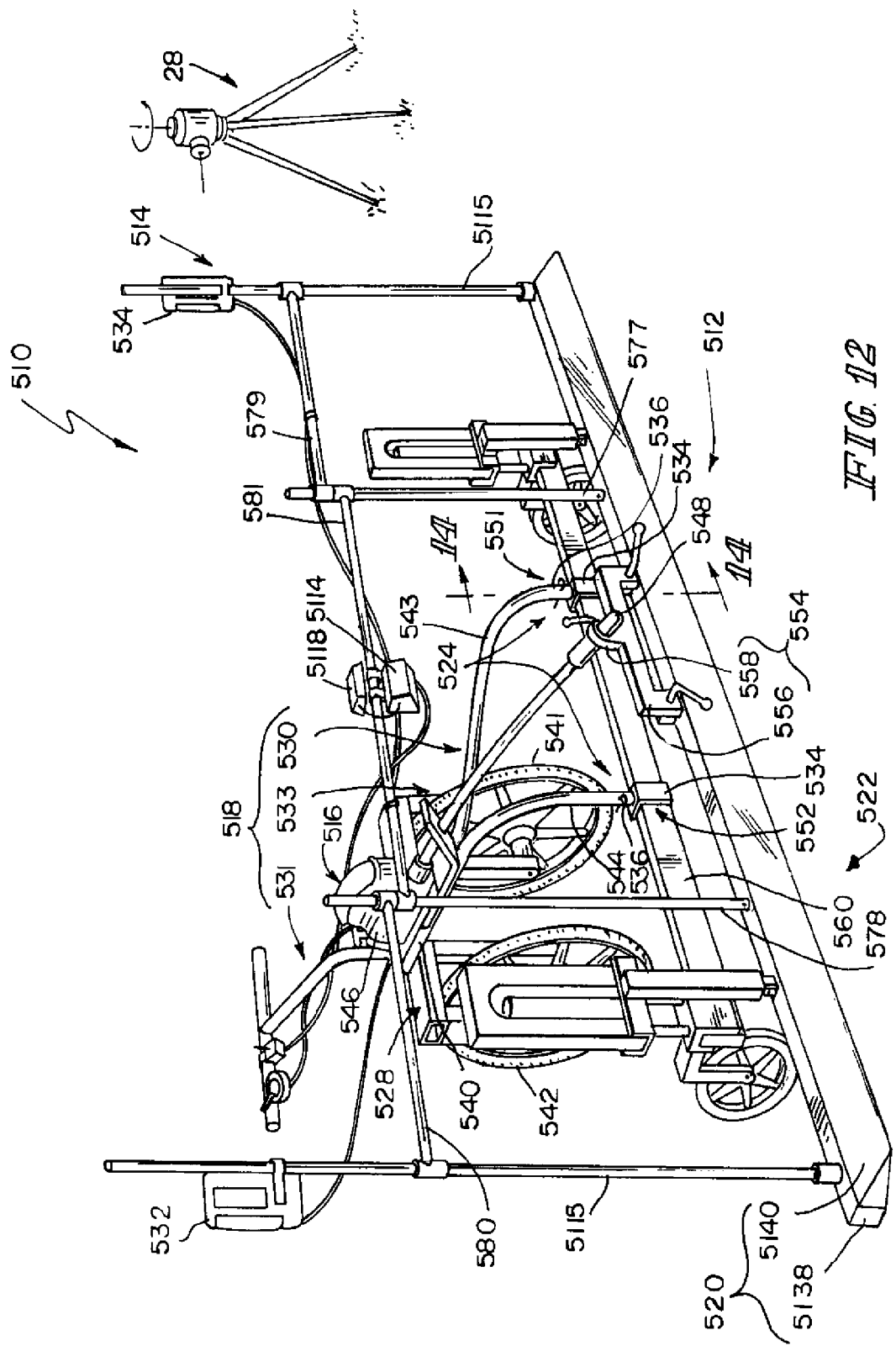
FIG. 12 is a perspective view of another embodiment of a material leveling system in accordance with the present disclosure, showing that the material leveling system is a screed system that includes a detachable frame, a screed unit coupled to the detachable frame, and an automatic leveling system cooperating with a grade laser to control a screed plate included in the screed unit to form wet concrete to produce a final grade level of concrete.
Figure 15:
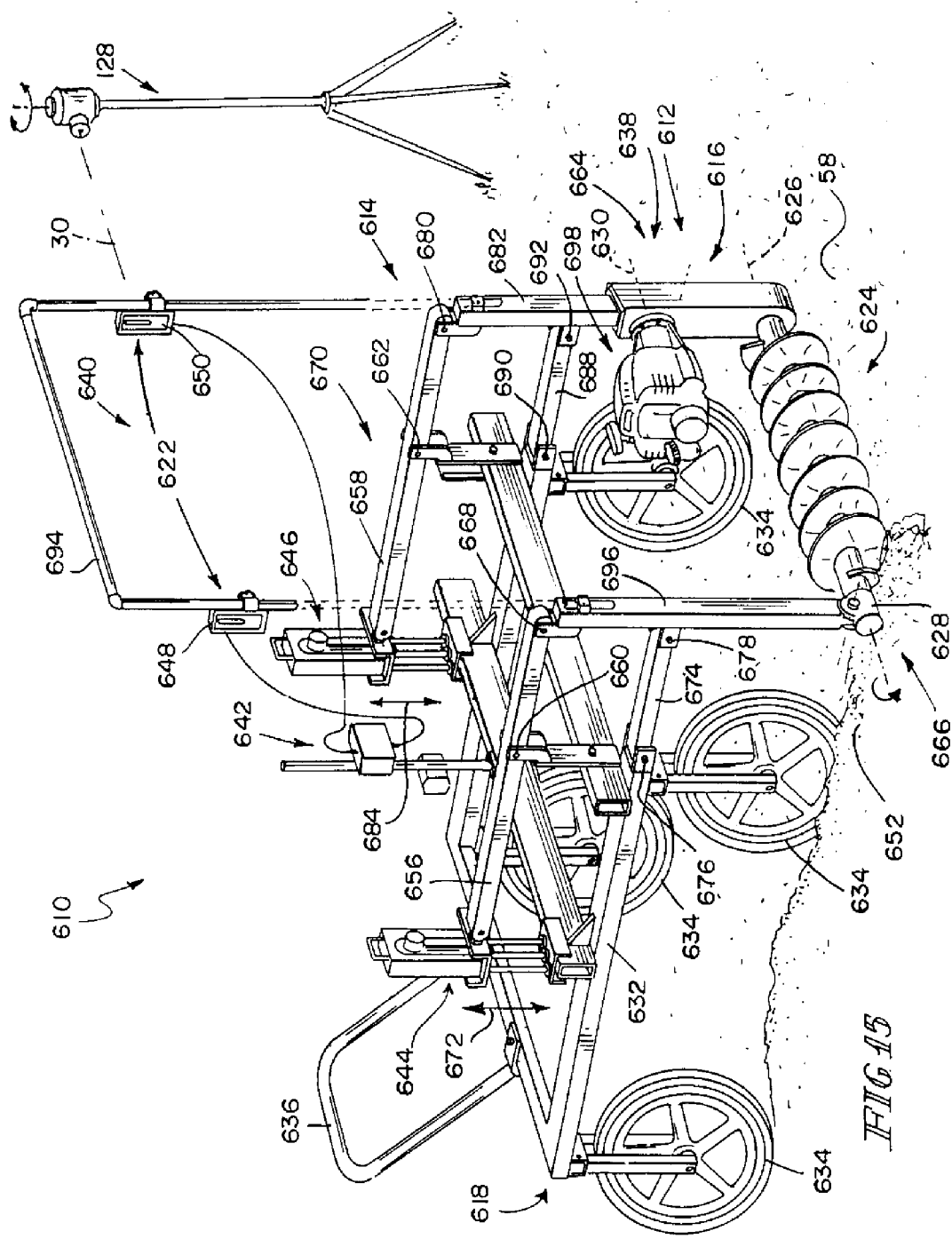
FIG. 15 is a perspective view of another embodiment of a material leveling system in accordance with the present disclosure, showing that the material leveling system includes an auger assembly adapted for displacing construction materials laterally away from the material leveling system and an automatic leveling system cooperating with a grade laser mounted on a tripod to control the vertical position of the ends of the auger assembly to establish a grade level.
Figure 16:
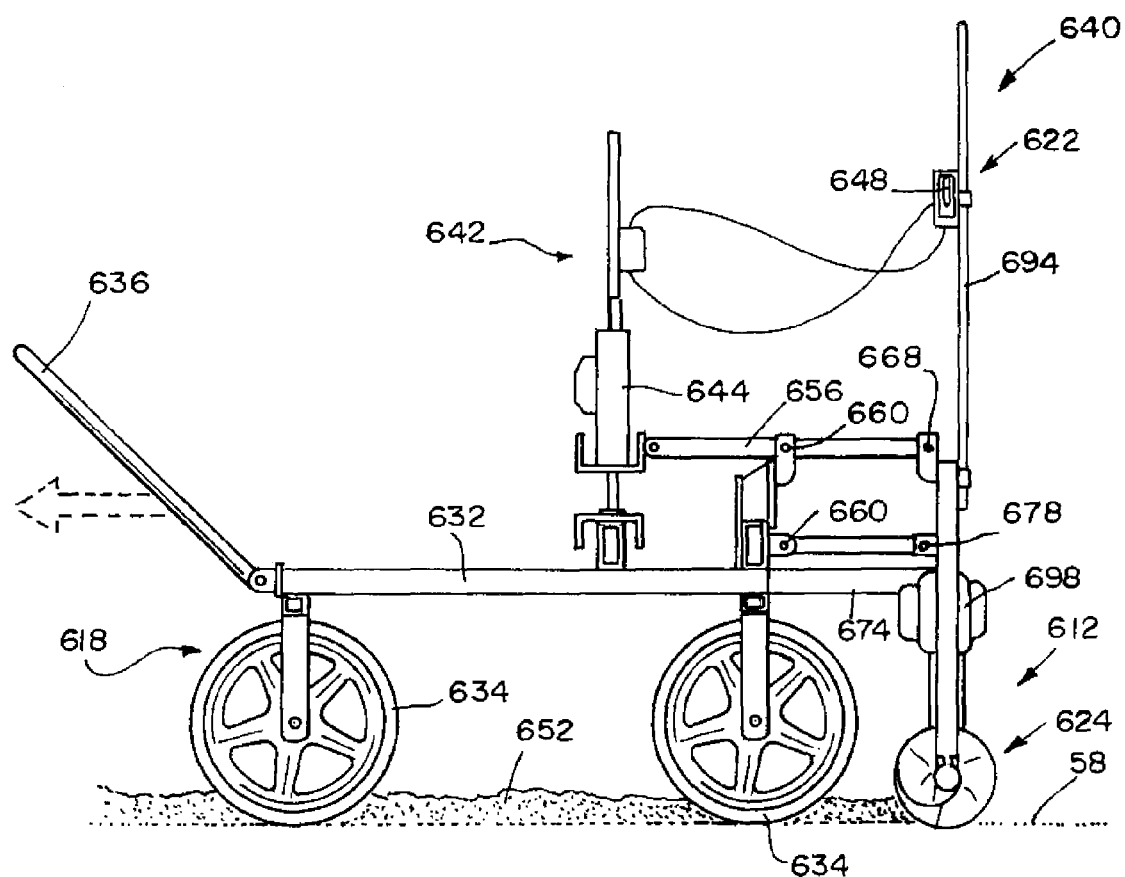
FIG. 16 is a side view of the material leveling system of FIG. 15 working construction materials positioned under a mobile-support frame of the material leveling system to displace the construction materials and form a grade level seen on the right side of FIG. 16.
Figure 17:
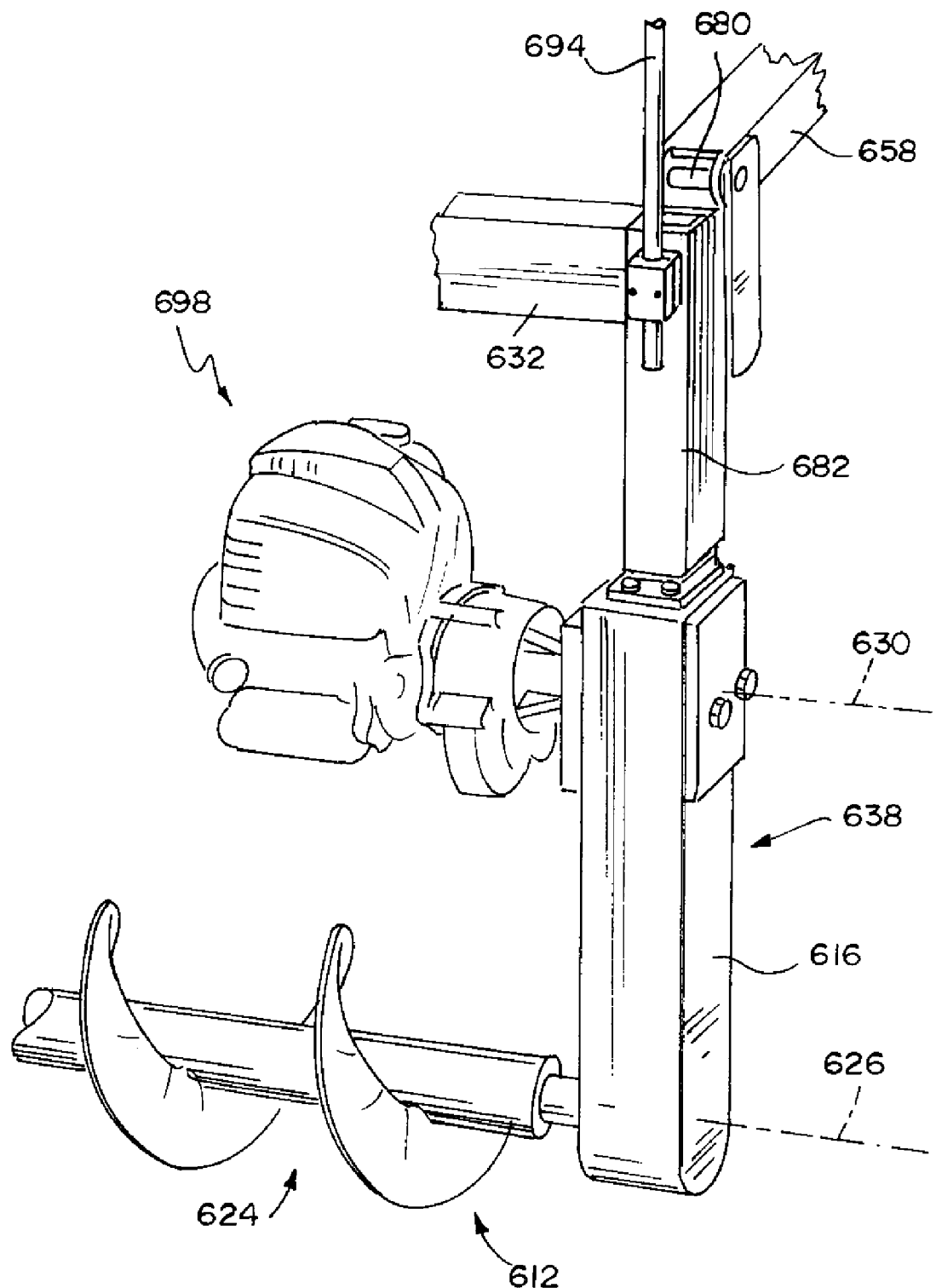
FIG. 17 is a perspective view of a portion of the material leveling system of FIG. 15 showing a driver of an auger assembly, the driver including a prime mover and a motion transmitter that transfers motion from the driver to an auger blade such that the auger blade works construction materials to displace the construction materials as the material leveling system is moved over a work area.

A material leveling system 10, 210, 310, 410, 510, 610 in accordance with the present disclosure, includes a leveling-implement assembly 12, 212, 512, 612 configured to place material at a final grade level 58 in a work area. Material leveling system 10, 210, 310, 410, 510, 610 further includes an automatic leveling system 14, 214, 314, 414, 514, 615 configured to control the vertical position of an implement 20, 220, 520, 624 included in leveling-implement assembly 12, 212, 512, 612 relative to a laser signal 30 emitted by a grade laser 28 as suggested in FIGS. 1, 9, and 15. A first embodiment of the material leveling system 10 is shown in FIGS. 1-8 wherein material leveling system 10 includes a screed plate 20 for working wet concrete 17. Other embodiments of material leveling systems 210, 310, 410 are shown in FIGS. 9-10 wherein the material leveling systems 210, 310, 410 includes rake plate 220 adapted to work dry construction materials such as sand or gravel. Yet another embodiment of material leveling system 510 is shown in FIGS. 12-14 wherein material leveling system 510 includes a removable implement that may be removed for storage of the material leveling system 510 by partially disassembling of material leveling system 510. Still yet another embodiment of material leveling system 610 is shown in FIGS. 15-17 wherein material leveling system 610 includes an auger blade 624 for working various construction materials.

Figure 1:
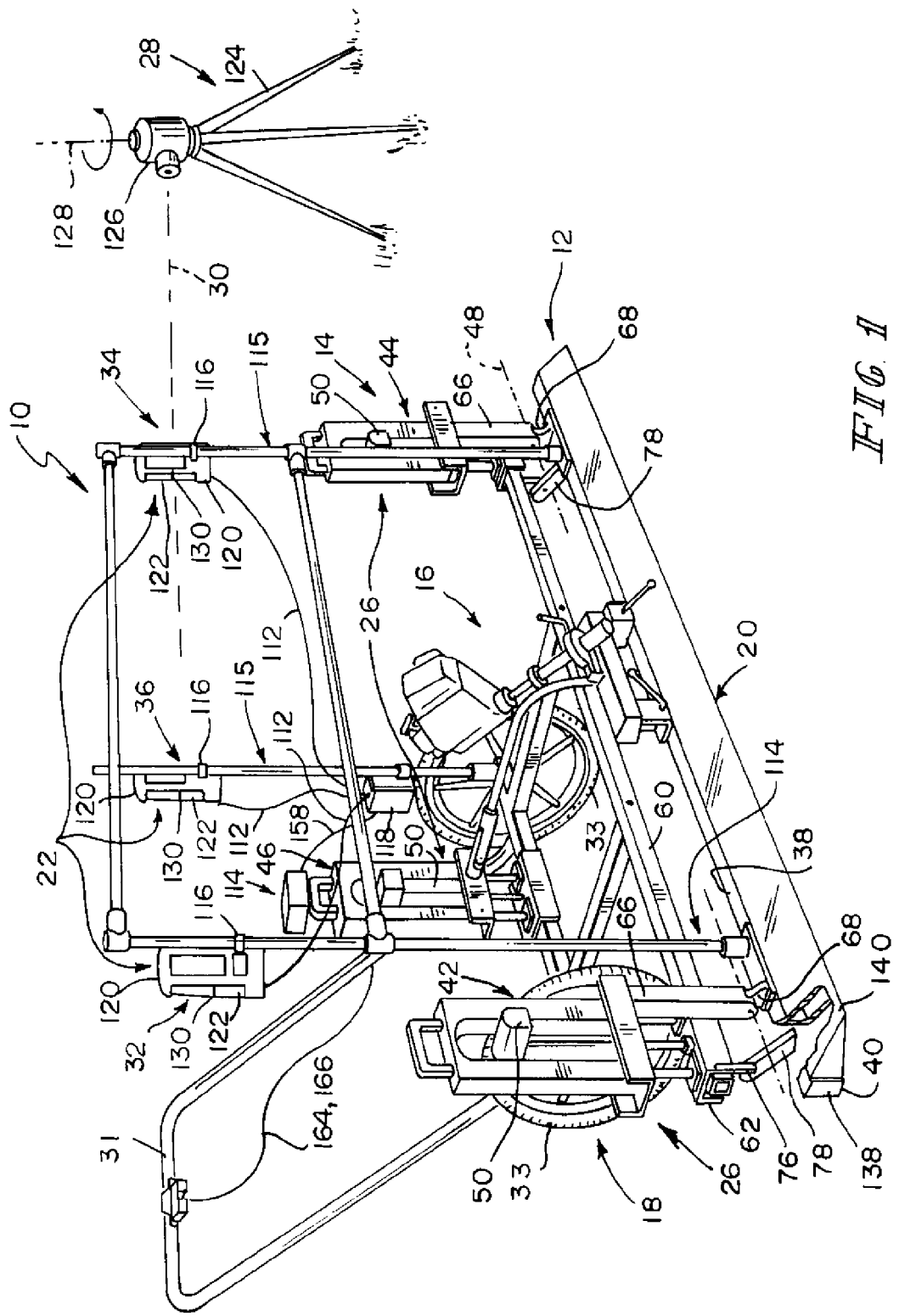
FIG. 1 is a perspective view of an embodiment of a material leveling system in accordance with the present disclosure, showing that the material leveling system is a screed system that includes a screed assembly adapted for removing excess concrete from a work area and an automatic leveling system cooperating with a grade laser mounted on a tripod to control a screed plate included in the screed assembly to form wet concrete so that a final grade level of concrete is obtained from the screeding process as suggested in FIGS. 2-4.

A material leveling system 10, in accordance with a first embodiment of the present disclosure, is shown in FIG. 1. Material leveling system 10 includes illustratively a leveling-implement assembly which is a screed assembly 12 adapted for working wet concrete 17 to a final grade level 58. Material leveling system 10 further includes an automatic leveling system 14. Screed assembly 12 includes a frame 18, a screed vibrator 16, and a screed plate 20. Screed plate 20 contacts wet concrete 17 to strike-off excess concrete and provide final grade level 58 of the concrete as shown in FIGS. 2-4. Screed vibrator 16 is coupled to screed plate 20 to vibrate screed plate 20 to work the wet concrete 17 during the screeding process. Automatic leveling system 14 is coupled to frame 18 and is configured to control the height of screed plate 20 and to maintain screed plate 20 at the proper pitch during the screeding process.

As shown in FIG. 1, automatic leveling system 14 includes a sensor system 22, a control system 24, and a implement positioning system 26. Sensor system 22 cooperates with a grade laser 28 positioned apart from screed assembly 12 and emitting a laser signal 30 used by sensor system 22 to determine the proper vertical position of screed plate 20. Sensor system 22 receives laser signal 30 and transmits laser signal data to control system 24. Control system 24 then determines the height of screed plate 20 and sends a signal to implement positioning system 26 to alter the vertical height of the screed plate 20 to achieve final grade level 58 of the concrete.

Figure 8:
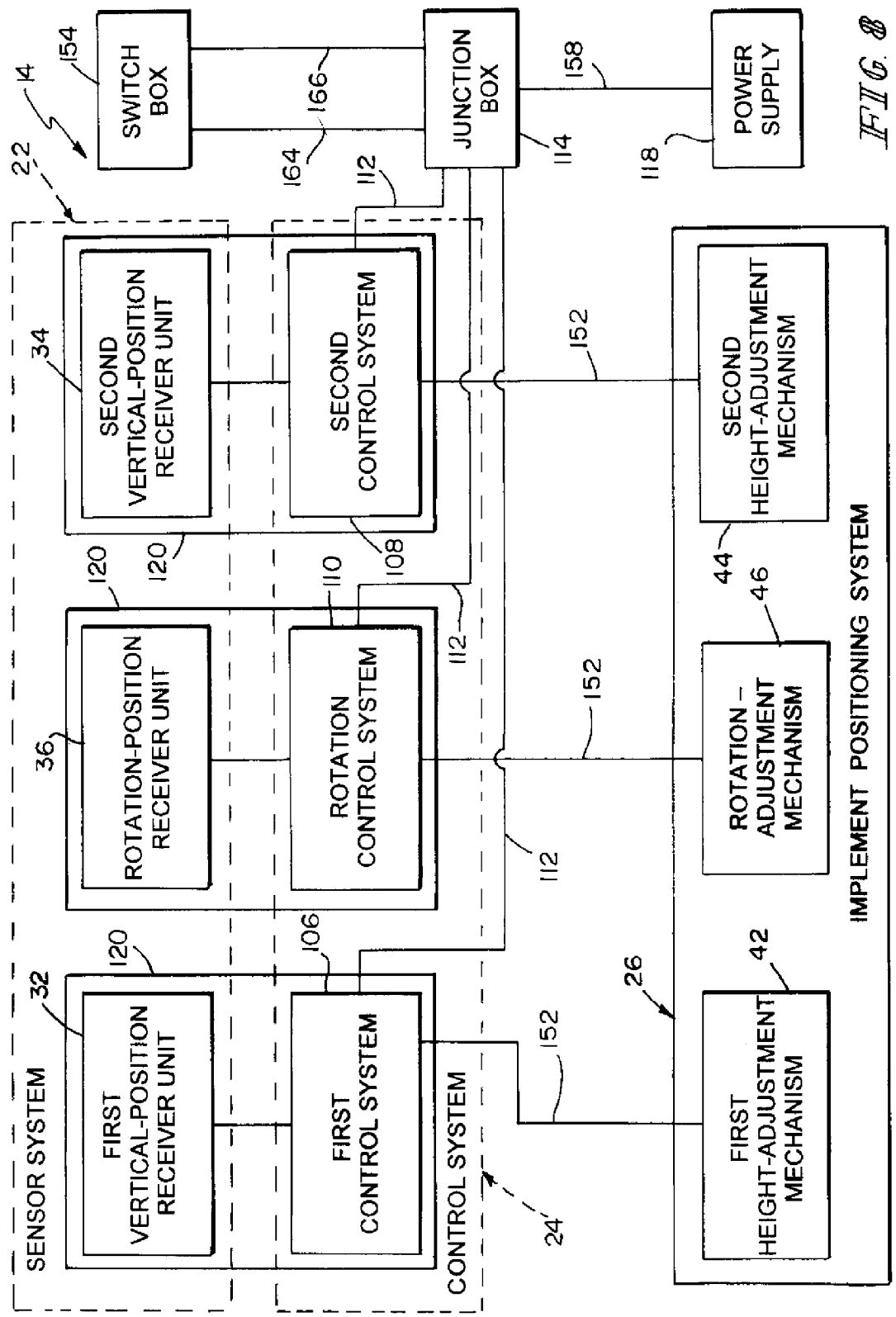
FIG. 8 is a diagrammatic view of an automatic leveling system suggesting that the automatic leveling system includes a sensor system feeding data to an automatic controller included in a control system, suggesting that the automatic controller processes the data and sends signals to an implement positioning system to cause the implement to remain at the final grade level and proper pitch, and suggesting that a controller selector operated by a user may choose between an automatic mode and a manual mode to control the vertical position of the implement.

Sensor system 22 includes two vertical-position receiver units 32, 34 and one rotational-position unit 36 as shown in FIGS. 1 and 8. Vertical-position receiver units 32, 34 are coupled to screed plate 20 to determine the vertical position of a bottom surface 40 of screed plate. Rotational-position unit 36 is configured to control the rotational position of screed plate 20 so that a bottom surface 40 of screed plate 20 remains parallel to final grade level 58 of the concrete during the screeding process.

Figure 7:
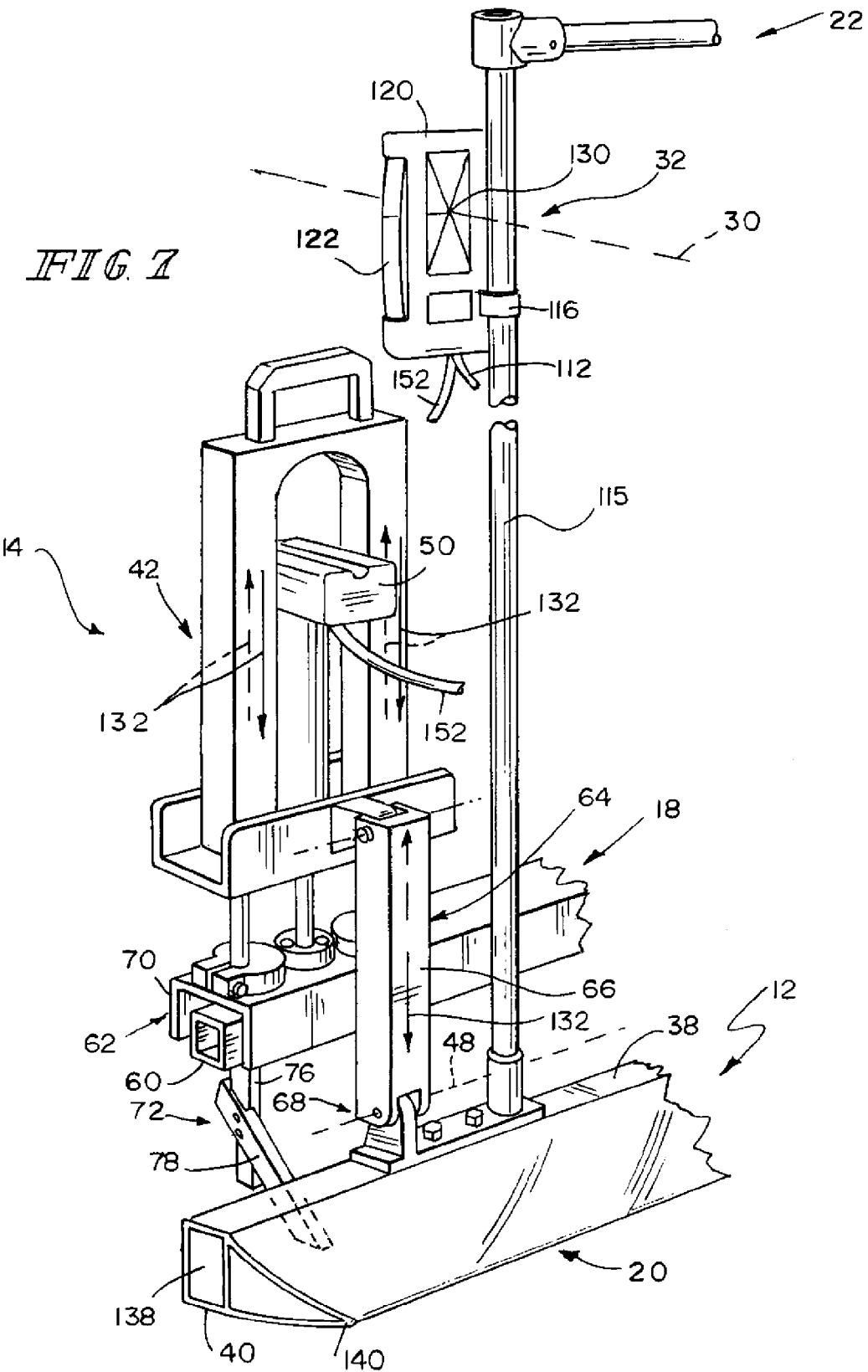
FIG. 7 is an enlarged partial perspective view the screed system of FIG. 1 showing a first vertical-position receiver unit coupled to the screed plate to move therewith and showing a first height-adjustment mechanism configured to change the vertical position of the screed plate and vertical-position receiver unit relative to the frame to maintain the vertical position receiver at the proper height.

First vertical-position receiver unit 32 is similar to the second vertical-position receiver unit 34 and only first vertical-position receiver unit 32 will be discussed in detail. As shown in FIG. 7, vertical-position receiver unit 32 includes a receiver-support bracket 115 secured to screed plate 20 by a fastener. Vertical-position receiver unit 32 further includes a mount 116 which supports a power supply 118 and a receiver-controller housing 120.

Receiver-controller housing 120 includes a laser-sensitive receiver panel 122 which is operable to detect laser signal 30. As shown in FIG. 1, grade laser 28 is mounted on a tripod 124 and includes a laser-emitter head 126 which rotates about a laser-rotation axis 128 which emits laser signal 30 indicating the desired vertical position of r receiver-controller housing 120. The desired vertical position of receiver-controller housing 120 is parallel to and offset from final grade level 58 by a pre-determined distance.

Receiver panel 122 has a target 130 as shown in FIG. 7. If laser signal 30 is detected above target 130, a signal is sent to control system 24 to command actuator 50 to extend to thereby raise receiver-controller housing 120 to a position in which a laser signal 30 emitted by grade laser 28 is on target 130. Similarly, if laser signal 30 is detected by receiver panel 122 below target 130, control system 24 commands actuator 50 to retract thereby lowering receiver-controller housing 120 until laser signal 30 is aligned with target 130. Screed plate 20 is coupled to first and second vertical-position receiver units 32, 34 so that movement of their companion actuators 50 controls the vertical position of screed plate 20 relative to frame 18.

Rotation-position unit 36 is similar to first vertical-position receiver unit 32 as shown in FIG. 1. Receiver-support bracket 115 of rotation-position unit 36 is coupled to screed-plate bracket 54 adjacent to rotation pivot 52 to move with screed-plate bracket 54 as illustrated in FIGS. 2-4.

As shown in FIGS. 1 and 8, implement positioning system 26 includes a pair of height-adjustment mechanisms 42, 44, as shown in FIG. 7, and a rotation-adjustment mechanism 46 as discussed above. Height-adjustment mechanisms 42, 44 interconnect screed plate 20 to frame 18 to cause screed plate 20 to move in an up-and-down direction 132 relative to frame 18. Thus, height-adjustment mechanisms 42, 44 control the vertical position of screed plate 20, and, effectively, the roll of the screed plate 20. Rotation-adjustment mechanism 46 interconnects screed plate 20 to frame 18 to cause screed plate 20 to rotate about a pivot axis 48 in either a clockwise direction 134, or a counter-clockwise direction 136 as suggested in FIG. 6. Thus, rotation-adjustment mechanism 46 controls the pitch of screed plate 20.

Pitch control of screed plate 20 prevents an inconsistent grade surface from developing due to an improper screed plate 20 during working of the concrete 17. Screed plate 20 includes screed-plate body 138 and a screed-plate tail 140. Screed-plate tail 140 is coupled to screed-plate body 138 and configured to extend away from screed-plate body and wheel assembly 33 of frame 18. Screed-plate tail 140 is configured to provide stability to screed-plate body 138 during the screeding process. When screed assembly 12 is in a pitched condition relative to the remainder of the material leveling system, as shown in FIGS. 3 and 4, the pitch of screed plate 20 may result in the screed-plate tail 140 to gouging into the finished concrete even if height-adjustment mechanisms 42, 44 have adjusted screed plate 20 to final grade level 58. Rotational-position unit 36 rotates screed plate 20 about pivot axis 48 to control the pitch of screed plate 20 to prevent screed-plate tail 140 from gouging the finished concrete as shown in FIG. 4.

Frame 18, included in screed assembly 12, includes a handle 31, a wheel assembly 33, and a support bar 60. Handle 31 is coupled to one end of wheel assembly 33 and support bar 60 is coupled to an opposite end of wheel assembly 33. Height-adjustment mechanisms 42, 44 of implement positioning system 26 are coupled to support bar 60. First height-adjustment mechanism 42 is positioned on a first end of support bar 60 and second height-adjustment mechanism 44 is positioned to lie in spaced-apart relation to second-height adjustment mechanism 44 on a second end of support bar 60.

Rotation-adjustment mechanism 46 is coupled illustratively to a center of screed plate 20 and to wheel assembly 33 of frame 18 as shown in FIGS. 2-5. Rotation-adjustment mechanism 46 includes an actuator 50, a rotation pivot 52, and a screed-plate bracket 54. Actuator 50 is coupled to wheel assembly 33 to move in an up-and-down direction 132 relative to wheel assembly 33. Rotation pivot 52 is coupled to actuator 50 on one end and screed-plate bracket 54 on the opposite end. Rotation pivot 52 is configured to allow relative movement between screed-plate bracket 54 and actuator 50. Screed-plate bracket 54 interconnects screed plate 20 and rotation pivot 52.

Screed plate 20 may rotate about pivot axis 48 in clockwise direction 134 as actuator 50 of rotation-adjustment mechanism 46 moves upwardly away from wheel assembly 33. During clockwise rotation of screed plate 20, axle mount 82 moves in a first direction 142 toward axle-mount receiver 84 of rotation pivot 52 and axle-mount receiver 84 rotates about rotation axis 56 in clockwise direction 134 as suggested in FIG. 5.

As shown in FIGS. 2-4, screed plate 20 may rotate in counter-clockwise direction 136 in response to downwardly movement of actuator 50 toward wheel assembly 33. During counter-clockwise rotation of screed plate 20, axle mount 82 moves in a second direction 144 away from axle-mount receiver 84 and axle-mount receiver 84 rotates about rotation axis 56 in counter-clockwise direction 136 as shown in FIGS. 2-4. As shown in FIG. 2, actuator 50 of rotation-adjustment mechanism 46 is at a first height 148 above wheel assembly 33. After rotation-adjustment mechanism 46 has corrected the pitch of screed plate 20 in FIG. 4, actuator 50 is at a second height 150 above wheel assembly 33 where second height 150 is smaller than first height 148.

First height-adjustment mechanism 42 is similar to the second height-adjustment mechanism 44 and only first height-adjustment mechanism 42 will be discussed in detail. First height-adjustment mechanism 42 as shown in FIG. 7, illustratively includes actuator 50, an actuator support 62, and a screed-plate support 64. Actuator support 62 is coupled to support bar 60 and moves with support bar 60. The actuator support 62 is positioned to lie between actuator 50 and support bar 60. Actuator 50 of first height-adjustment mechanism 42 is coupled to actuator support 62 for movement in an up-and-down direction 132 relative to support bar 60. Screed-plate support 64 is coupled to actuator 50.

As shown in FIG. 7, screed-plate support 64 includes a support beam 66 and a support pivot 68 defining pivot axis 48. Support beam 66 is coupled at a first end to actuator 50 and is coupled at a second end to support pivot 68. Support pivot 68 is coupled to top edge 38 of screed plate 20 to cause screed plate 20 to pivot about pivot axis 48 in response to movement of rotation-adjustment mechanism 46 as suggested in FIG. 6.

Actuator support 62 includes an actuator-support mount 70 and a support-bar guide 72 as shown in FIG. 7. Actuator-support mount 70 is coupled to support bar 60 in a fixed position so that actuator 50 may move in up-and-down direction 132 relative to support bar 60. Support-bar guide 72 is coupled to actuator-support mount 70 to move with support bar 60 and control the distance between rough grade 74 and support bar 60.

As shown in FIG. 7, support-bar guide 72 includes a guide bracket 76 and a guide 78. Guide bracket 76 is coupled to actuator-support mount 70 so that support bar 60 included in frame 18 is parallel to rough grade 74 as shown in FIG. 2 and a fixed distance above rough grade 74. Guide 78 is illustratively a thin strip of metal coupled on one end to guide bracket 76 and extending downwardly from guide bracket 76 towards rough grade 74 to form an acute angle 45 between guide 78 and rough grade 74 as shown in FIG. 6. Guide 78 positioned to form acute angle 45 allows guide 78 to be pulled over rough grade 74 while remaining in contact with rough grade 74.

In an illustrative embodiment, a support-guide bar includes a guide bracket and a guide. Guide is illustratively a wheel coupled to guide bracket and arranged to rotate freely to allow guide to be pulled over rough grade 74 while remaining in contact with rough grade 74.

The pitch of screed plate 20 is adjusted by rotation-adjustment mechanism 46. Rotation pivot 52 cooperates with actuator 50 to convert the up-and-down movement of actuator 50 into rotational movement of screed plate 20.

Rotation pivot 52, as shown in FIG. 5, includes a rotation axle 80, an axle mount 82, and an axle-mount receiver 84. Axle mount 82 is coupled to screed-plate bracket 54 and configured to extend toward actuator 50 of rotation-adjustment mechanism 46 and into mating contact with axle-mount receiver 84. Axle-mount receiver 84 is coupled to actuator 50 of rotation-adjustment mechanism 46. Rotation axle 80 is configured to couple axle-mount receiver 84 to axle mount 82 by extending through axle-mount receiver 84 and axle mount 82.

As shown in FIG. 5, axle mount 82 is formed to include a thin portion 86 and a relatively wider wide portion 88. Wide portion 88 is position to lie between thin portion 86 and screed plate bracket 54. Thin portion 86 is configured to mate with axle-mount receiver 84 and formed to include an axle passageway 90 arranged to extend through thin portion 86 of axle mount 82 so that rotation axle 80 passes through axle passageway 90.

Axle-mount receiver 84 is formed to include a pivot-axle slot 92 and an axle-mount groove 94 as illustrated in FIG. 5. Axle-mount groove 94 is defined by two vertical-guide arms 96, 98. First vertical-guide arm 96 is positioned to lie in spaced-apart relation from second vertical-guide arm 98 and axle-mount groove 94 is formed therebetween. Axle-mount groove 94 is configured so that axle mount 82 is positioned to lie between first and second vertical-guide arms 96, 98 to cause pivoting in a vertical plane and block rotation in a side-to-side direction as suggested in FIG. 5. Pivot-axle slot 92 is defined by a first end 100 and a second end 102 positioned to lie in spaced-apart relation to first end 100. Pivot-axle slot 92 also extends through first and second vertical-guide arms 96, 98 to allow rotation axle 80 rotate about rotation pivot 52 and slide between first and second ends 100, 102 of pivot-axle slot 92 as suggested in FIG. 5.

As illustrated in FIG. 2, axle passageway 90 is positioned to lie about mid-way between first end 100 and second end 102 of pivot-axle slot 92 of rotation pivot 52 upon movement of screed assembly 12 to a generally parallel position relative to rough grade 74 below. As shown in FIG. 3, when screed assembly 12 rolls onto a bump 104 formed in rough grade 74, screed plate 20 is forced downward into finished concrete creating an un-finished grade level. Automatic leveling system 14 corrects the un-finished grade level by lowering actuator 50 of rotational-adjustment mechanism 46 to bring screed plate 20 back into the proper pitch as suggested in FIG. 4. As actuator 50 is lowered, rotation axle 80 moves toward first end 100 of pivot-axle slot 92 creating a shorter screed-plate bracket 54 to cause screed plate 20 to rotate in counter-clockwise direction 136 as shown in FIG. 4.

Automatic leveling system 14 includes control system 24, sensor system 22, and implement positioning system 26 as shown illustratively in FIG. 8. Sensor system 22 includes first vertical-position receiver unit 32, second vertical position receiver unit 34, and rotation-position receiver unit 36. Control system 24 includes first control system 106, second control system 108, and rotation control system 110. Illustratively, first vertical-position receiver unit 32 and first control system are coupled together and housed within a receiver-controller housing 120. Similarly, second vertical-position receiver 34 and second control system 108, as well as rotation-position receiver 36 and rotation control system 110 are housed within their own receiver-controller housing 120.

Illustratively, each control system 106, 108, 110 is connected via power-command cables 112 to a junction box 114. Each power-command cable 112 supplies each control system 106, 108, 110 and its companion position receiver unit 32, 34, 36 with a ground connection, power connection, a manual movement signal connection, and a control mode connection. Each control system 106, 108, 110 is further connected to its companion adjustment mechanism 42, 44, 46 by a power-control cable 152. Illustratively first control system 106 is interconnected to first height-adjustment mechanism 42 via power-control cable 152 supplying first height-adjustment mechanism with a power connection and a control signal as suggested in FIG. 8.

Automatic leveling system 14 further includes a switch box 154 and a power supply 118. Power supply 118 is connected to junction box 114 via a power cable 158. Junction box 114 then splits power from power supply 118 into power-command cable 112. Illustratively, power supply 118 is a battery. It should be understood that other sources of power may be used in some embodiments. Switch box 154 includes a mode-selection switch 160 and a manual-movement switch 162. Mode-selection switch 160 is coupled to junction box 114 by a mode cable 164 and is configured to allow a user to select whether the vertical position of screed plate 20 is controlled by sensor system 22 feeding control system 24 or by a user using manual-movement switch 162.

When mode-selection switch 160 is set to automatic mode, the vertical position and the rotational position of screed plate 20 is controlled by sensor system 22 cooperating with grade laser 28. When mode-selection switch 160 is set to manual mode, the vertical position and the rotational position of screed plate 20 is controlled by a manual-movement switch 162 coupled to junction box 114 by manual-input cable 166. Manual mode may be used to raise screed plate 20 relative to rough grade 74 so that screed plate 20 may be repositioned without disrupting previously screeded concrete.

Figure 11:
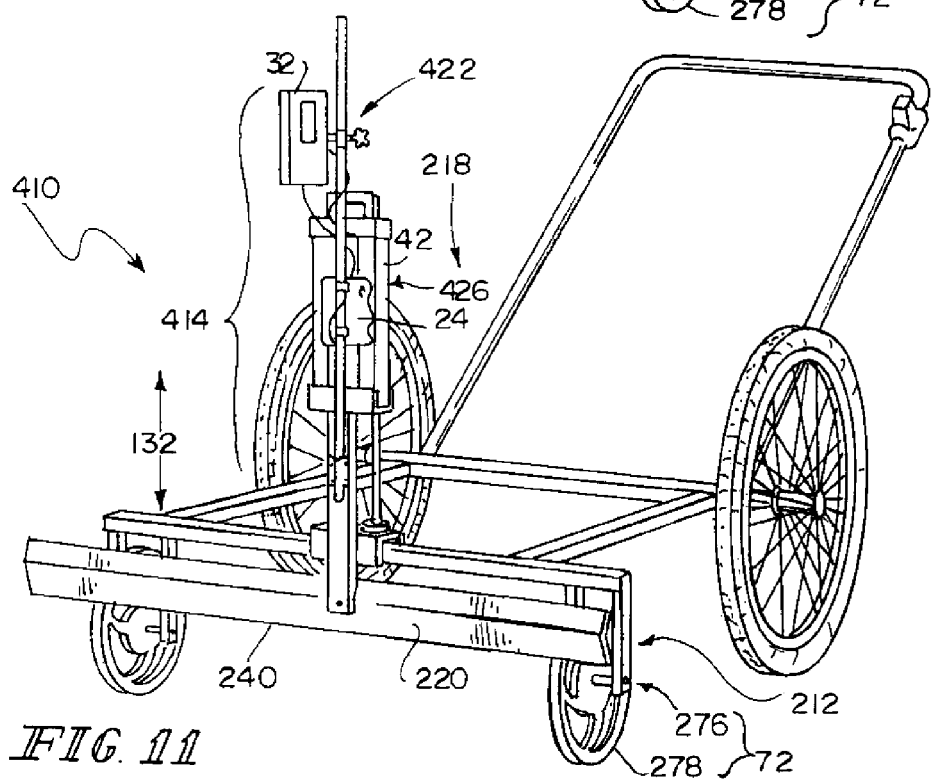
FIG. 11 is a perspective view of another embodiment of a material leveling system in accordance with the present disclosure, showing the material leveling system includes a rake assembly including an automatic leveling system that includes a single vertical-position receiver configured to control a single height-adjustment mechanism to change the vertical position of the rake bar so that a final grade level of material is produced during the raking process.

Other embodiments of material leveling systems 210, 310, 410, in are shown in FIGS. 9-11. Material-leveling systems 210, 310, 410 each include a leveling-implement assembly embodied as a rake assembly 212. Rake assembly 212 is adapted to move across a work area and to remove excess material in the work area. Material-leveling system 210, 310, 410 each further include a respective automatic leveling system 214, 314, 414 configured to control the vertical position of a rake plate 220 included in rake assembly 212 relative to laser signal 30.

Illustratively, material-leveling system 210 includes rake assembly 212 and automatic leveling system 214 as shown in FIG. 9. Rake assembly 212 includes a frame 218 and a rake plate 220. Furthermore, rake assembly 212 has omitted screed vibrator 16 included in screed assembly 12. Automatic leveling system 214 is coupled to frame 218 and is configured to control the vertical position of rake plate 220 and the pitch of rake plate 220. Automatic leveling system 214 is similar to automatic leveling system 14 which includes sensor system 22, control system 24, and rake-plate positioning system 326.

As shown in FIGS. 1, 8 and 9, rake-plate positioning system 226 includes a pair of height-adjustment mechanisms 42, 44 and a rotation-adjustment mechanism 46 as discussed above. As illustrated in FIG. 9, height-adjustment mechanisms 42, 44 interconnect rake plate 220 to frame 218 to cause rake plate 220 to move in an up-and-down direction 132 relative to frame 218. Thus, height-adjustment mechanisms 42, 44 control the vertical position of rake plate 220. Rotation-adjustment mechanism 46 interconnects rake plate 220 to frame 218 to cause rake plate 220 to rotate about a pivot axis 48 in either a clockwise direction 134, or a counter-clockwise direction 136 as suggested in FIG. 9. Thus, rotation-adjustment mechanism 46 controls the pitch of rake plate 220.

As shown in FIGS. 9-11, frame 218 included in rake assembly 212 includes handle 31, wheel assembly 33, and support bar 60. Handle 31 is coupled to one end of wheel assembly 33 and support bar 60 is coupled to an opposite end of wheel assembly 33. Height-adjustment mechanisms 42, 44 of implement positioning system 26 are coupled to support bar 60. First height-adjustment mechanism 42 is similar to second height-adjustment mechanism 44 and only first height-adjustment mechanism 42 will be discussed in detail.

First height-adjustment mechanism 42 as shown in FIG. 9, illustratively includes actuator 50, an actuator support 62, and a rake-plate support 264. Actuator support 62 is coupled to support bar 60 and is positioned to lie between actuator 50 and support bar 60. Actuator 50 of first height-adjustment mechanism 42 is coupled to actuator support 62 for movement in an up-and-down direction 132 relative to support bar 60. Rake-plate support 264 is coupled to actuator 50.

As shown in FIG. 9, rake-plate support 264 includes a support beam 66 and a support pivot 68 defining pivot axis 48. Support beam 66 is coupled at a first end to actuator 50 and is coupled at a second end to support pivot 68. Support pivot 68 is coupled to top edge 238 of rake plate 220 to cause rake plate 220 to pivot about pivot axis 48 in response to movement of rotation-adjustment mechanism 46.

Actuator support 62 includes an actuator-support mount 70 and a support-bar guide 72 as shown in FIG. 9. Actuator-support mount 70 is coupled to support bar 60 in a fixed position so that actuator 50 may move in up-and-down direction 132 relative to support bar 60. Support-bar guide 72 is coupled to actuator-support mount 70 to move with support bar 60 and control the distance between rough grade 74 and support bar 60.

As shown in FIG. 9, support-bar guide 72 includes a guide bracket 276 and a guide 278. Guide bracket 276 is coupled to actuator-support mount 70 so that support bar 60 included in frame 218 is parallel to rough grade 74 as suggested in FIG. 9 and a fixed distance above rough grade 74. Guide 278 is illustratively a wheel coupled to guide bracket 276 and arranged to rotate freely to allow guide to be pulled over rough grade 74 while remaining in contact with rough grade 74.

Illustratively, material-leveling system 310 shown in FIG. 10 includes rake assembly 212 and an automatic leveling system 314. Automatic leveling system 314 is coupled to frame 218 and is configured to control the vertical position of rake plate 220. Automatic leveling system 314 includes a sensor system 322, control system 24, and a rake-plate positioning system 326.

As shown in FIG. 10, sensor system 322 includes two vertical-position receiver units 32, 34. Vertical-position receiver units 32, 34 are coupled on each end of rake plate 220 to determine the vertical position of a bottom surface 240 of rake plate 220 relative to laser signal 30. Rake-plate positioning system 326 includes a pair of height-adjustment mechanisms 42, 44. Each height-adjustment mechanism 42, 44 interconnects rake plate 220 to frame 218 to cause rake plate 220 to move in an up-and-down direction 132 relative to frame 218. Thus, height-adjustment mechanisms 42, 44 control the vertical position of rake plate 220 in response to signals obtained from vertical-position receiver units 32, 34.

Illustratively, a material-leveling system 410 shown in FIG. 11 includes rake assembly 212 and an automatic leveling system 414. Automatic leveling system 414 is coupled to frame 218 and is configured to control the vertical position of rake plate 220. Automatic leveling system 414 includes a sensor system 422, control system 24, and a rake-plate positioning system 426.

As shown in FIG. 10, sensor system 422 includes a single vertical-position receiver unit 32. Vertical position receiver unit 32 is coupled to a center portion of rake plate 220 to determine the vertical position of bottom surface 240 of rake plate 220 relative to laser signal 30. Rake-plate positioning system 426 includes a single height-adjustment mechanism 42. Height-adjustment mechanism 42 interconnects rake plate 220 to frame 218 to cause rake plate 220 to move in an up-and-down direction 132 relative to frame 218. Thus, height-adjustment mechanism 42 controls the vertical position of rake plate 220 in response to signals obtained from vertical position receiver units.

A material leveling system 500, in accordance with another embodiment of the present disclosure, is shown in FIGS. 12-15. Material leveling system 500 includes a screed assembly 512 and an automatic leveling system 514. Automatic leveling system 514 cooperates with a grade laser 28 to adjust the vertical position of screed assembly 512 so that material is placed at a final grade level 58 in a work area. Screed assembly 512 is able to be configured between an in-use configuration state where screed assembly 512 can be used to work un-leveled material and a stored configuration state where screed assembly 512 is partially disassembled for ease of storage and transportation.

As shown in FIG. 13, screed assembly 512 includes a mobile-support frame 518, a screed unit 522, and a frame coupler 524. Frame coupler 524 interconnects mobile-support frame 518 to screed unit 522 so that screed unit 522 may be configured for use to illustratively screed concrete and then re-configured for storage by disconnecting mobile-support frame 518 from screed unit 522.

Mobile-support frame 518, as shown in FIG. 13, includes a handle 531, a wheel assembly 533, and a detachable frame 530. Handle 531 is coupled to a rear portion of wheel assembly 533 to provide an operator with means for moving screed assembly 512 in a rearward direction away from level concrete (e.g. concrete that has been screeded) and for moving screed assembly 512 from a first work area to a second work area where un-worked concrete is present. Detachable frame 530 is coupled to front portion of wheel assembly 533 and to screed unit 522.

As shown in FIGS. 12 and 13, screed unit 522 includes include a screed vibrator 516, a screed plate 520, and a screed-support bar 560. Screed vibrator 516 is coupled to detachable frame 530 in a fixed position and is coupled detachably to screed bar 560 to facilitate disassembly of screed assembly 512 for storage. Screed plate 520 is coupled to screed-support bar 560 to move in an up-and-down direction relative to screed-support bar 560 by automatic leveling system 514. Screed-support bar 560 is coupled to a front portion of detachable frame 518 by frame coupler 524.

Screed unit 522, as illustrated in FIG. 13, further includes first and second intermediate support rods 577, 578 and first, second, and third stabilizer rods 579, 580, 581. First and second intermediate support rods 577, 578 are coupled to screed plate 520 at intermediate positions between a center point of screed plate 520 where screed vibrator 516 is coupled and end points of screed plate 520. Each intermediate support rod 577, 578 extends upwardly away from screed plate 520. Stabilizer rods 579, 580 interconnect receiver-support brackets 5115 and intermediate support rods 577, 578 as shown in FIGS. 12 an 13. Stabilizer rods 579, 580 cooperate with intermediate support rods 577, 578 to minimize vibration of vertical-position receiver units 532, 534 during screeding. Third stabilizer rod 581 interconnects first and second intermediate support rods 577, 578 and functions to support power supply 5118 and junction box 5114 of automatic leveling system 514.

Frame coupler 524, as suggested in FIG. 12, includes a first quick-connect joint 551 and a second quick-connect joint 552 positioned to lie in spaced-apart relation to the first quick-connect joint 551. Each quick-connect joint includes a bracket 534 coupled to screed-support bar 560 in a fixed position, an arm mount 536 coupled to detachable frame 530 in a fixed position, and a snap pin 538 arranged to interconnect arm mount 536 and bracket 534 when screed assembly 512 is in the in-use configuration state as shown in FIG. 12.

Illustratively, bracket 534 includes a first plate 557, a second plate 558, a connector plate 563, and a mount collar 562 as shown FIG. 14. First plate 557 is arranged to lie in confronting relation with a back surface of screed-support bar 560 that is arranged to face toward mobile-support frame 518. Second plate 558 is positioned to lie in spaced-apart relation to first plate 557 and to lie in confronting relation with an opposite front face of screed-support bar 560. Illustratively, screed-support bar 560 is arranged to lie between first plate 557 and second plate 558. Connector plate 563 is arranged to extend between first and second plate 557, 558 and lie in confronting relation with a top surface of screed-support bar 560. As an example, mount collar 562 is a circular tube coupled to connector plate 563 and is arranged to extend upwardly away from screed-support bar 560.

Illustratively, bracket 534 is coupled to screed-support bar 560 by two bolts 564 and two companion nuts 566. Each bolt 564 extends through a hole formed in first plate 557, a hole formed in the screed-support bar 560, and a hole formed in the second plate 558. All three holes are aligned to allow bolt 564 to pass through the holes and have a nut 566 couple bolt 564. Also, mount collar 562 is illustratively formed to include a pair of through holes 568 to allow snap pin 538 to pass through the pair of holes 568.

As suggested in FIG. 13, arm mount 536 includes an arm-mount tube 570 that is formed to include a pair of snap-pin apertures 572 and a collar-receiver space 574. Illustratively, the pair of snap-pin apertures 572 are arranged to align with the through holes 568 of mount collar 562 to allow snap pin 538 to pass through both sets of holes and couple mobile-support frame 518 to screed unit 522. Arm-mount tube 576 is sized to allow mount collar 562 to rest within collar-receiver space 574 when screed assembly 512 is in the in-use configuration state.

Detachable frame 530, as shown in FIG. 13, includes an extension bar 540, a first arm 543, and a second arm 544. Extension bar 540 is coupled on one end to wheel assembly 533 and on an opposite end to both arms 543, 544. First arm 543 is arranged to extend away from the opposite end of extension bar 540 toward first quick-connect joint 551 and second arm 544 is arranged to extend away from the opposite end of extension bar 540 toward second quick-connection joint 552. Illustratively, detachable frame is arranged to have a wishbone shape as illustrate in FIGS. 12 and 13.

Wheel assembly 533, as shown in FIGS. 13 and 14, includes a first wheel 541, a second wheel 542, and a wheel support 528 arranged to support and extend between first and second wheels 541, 542 for rolling movement relative to wheel support 528. Illustratively, handle 531 is coupled to a central portion of wheel support 528 and is configured to extend upwardly and away from the wheel assembly 533. Extension bar 540 of detachable frame 530 is coupled to the central portion of wheel support 528.

As shown in FIGS. 12 and 13, screed vibrator 516 includes a vibratory power supply 546, a vibratory head 548, and a power-supply mount 550. Illustratively, power-supply mount is coupled to extension bar 540 of detachable frame 530 in a fixed position. Vibratory head 548 is coupled to vibratory power supply 546 and coupled detachably to screed plate 520 so that when screed assembly 512 is in the storage configuration, mobile-support frame 518 may be separated from screed unit 522.

Screed plate 520 includes a screed-plate body 5138, a screed-plate tail 5140, and a vibratory-head retainer 554 as shown in FIGS. 12 and 13. Screed-plate body 5138 is interconnected to screed-support bar 560 by automatic leveling system 514. Screed-plate tail 5140 is coupled to screed-plate body 5138 as disclosed above. Vibratory-head retainer 554 is coupled to a center portion of screed-plate body 5138 to cause vibrations formed in vibratory head 548 to be transmitted to screed-plate body 5138 and screed-plate tail 5410.

As shown in FIGS. 12 and 13, vibratory-head retainer 554 includes a mounting bracket 556 coupled to screed-plate body 5138 in a fixed position and a vibratory-head coupling 558 coupled to the mounting bracket 556. Illustratively, vibratory-head coupling 558 is an adjustable C-shaped bracket configured to allow vibratory head 548 to be coupled to screed plate 520 when screed assembly 512 is in the in-use configuration state and detached from screed plate 520 when screed assembly 512 in stored configuration state as suggested in FIG. 13.

Illustratively, detachable frame 530 when compared to frame 18, is longer than frame 18. The extended length of detachable frame 530 increases the distance between handle 531 and vertical-position receiver units 532, 534 of automatic leveling system 514. The increased distance minimizes the impact changes in the vertical position of wheels 541, 542 have on the tilt of vertical-position receiver units 532, 534 thereby improving accuracy during screeding.

As shown in FIG. 12, screed vibrator 516 is supported by detachable frame 530 as compared to screed-support bar 60 as shown in FIG. 1. Moving screed vibrator 516 from screed-support bar 60 to detachable frame 530 improves the mobility of screed assembly 512, particularly when pushing screed assembly 512 forward to reposition screed assembly 512. The repositioning of the weight also allows for improved balance of screed assembly 512 thereby aiding the operator during use.

Screed plate 520, as compared to screed plate 20 of FIG. 1, is longer than screed plate 20. As an example, screed plate 520 is about 12 feet long and screed plate 20 is about 8 feet long. Vertical-position receiver units 532, 534 have also been moved to the outer ends of screed plate 520. The repositioning of vertical-position receiver units 532, 534 to the ends of screed plate 520 allow for maximized accuracy of vertical-position receiver units 532, 534 as any change in rotational position of screed assembly 512 is magnified at the outer ends of screed plate 520.

In yet another embodiment of a material leveling system 610 shown in FIGS. 15-17, the material leveling system 610 includes a leveling-implement assembly illustratively embodied as an auger assembly 612, a mobile-support frame 618, and an automatic leveling system 614 supported on the mobile-support frame 618 with the auger assembly 612 supported and positioned by the automatic leveling system 614. The mobile-support frame 618 is movable over uneven construction material 652 such as dirt, gravel, or wet concrete while the auger assembly 612 works the construction material 652 to move materials and form a grade level 58.

The auger assembly 612 includes a helical blade 624 which is rotatable about an axis 626. Rotation of the auger blade 624 about axis 626 results in the auger blade 624 moving materials forming the construction material 652 laterally away from the material leveling system 610. Auger blade 624 is supported at a bearing end 666 by a bearing 628 and at a drive end 664 by a driver 638. The driver 638 includes a prime mover 698 and a motion transmitter 616. Motion transmitter 616 receives rotational input from prime mover 698, illustratively embodied as an internal combustion engine. Prime mover 698 creates rotation about an axis 630 and motion transmitter 616 transfers the rotational motion about axis 630 to rotation of the auger blade 624 about axis 626.

Mobile-support frame 618 includes a frame 632, frame 632 supported on wheels 634, and a handle 636 coupled to frame 632. A user applies force to handle 636 to move mobile-support frame 618 over the work area to work construction materials 652 and form grade level 58. While the mobile-support frame 618 is moved manually in the illustrative embodiment, it should be understood that mobile-support frame 618 may include powered wheels in some embodiments, the powered wheels being used to move the mobile-support frame 618 over a work area. Automatic leveling system 614 is supported on mobile-support frame 618 and operable to control the position of auger assembly 612 relative to mobile-support frame 618. Automatic leveling system 614 includes an automatic leveling system 640 and a positioning mechanism 670. Automatic leveling system 640 includes a sensor system 622, a control system 642, and two adjustment mechanisms 644 and 646. Sensor system 622 includes two position receiver units 648 and 650 similar to receiver units 32 and 34 discussed with regard to the embodiment of FIG. 1. Position receiver units 648 and 650 detect a target signal 30 from a grade laser 28. Control system 642 responds to the signals received by position receiver units 648, 650 and operate adjustment mechanisms 644 and 646 to adjust the position of the ends of auger assembly 612.

Each of adjustment mechanisms 644 and 646 are movable vertically relative to frame 632 as indicated by arrows 672 and 684. Adjustment mechanisms 644 and 646 operate in the same manner as adjustment mechanisms 42 and 44 discussed above with reference to material leveling system 10. Movement of adjustment mechanisms 644 and 646 cause movement of portions of positioning mechanism 670 to effect vertical movement of the auger assembly 612 relative to mobile-support frame 618.

Positioning mechanism 670 includes a pair of support arms 656 and 658 which are each supported on frame 632 of mobile-support frame 618 at respective pivots 660 and 662 such that support arms 656 and 658 are pivotably about pivots 660 and 662. Support arm 656 is also pivotably coupled to a vertical support 696 which supports bearing end 666 of the auger assembly 612. A pin 668 interconnects support arm 656 and vertical support 696 so that vertical support 696 may pivot relative to support arm 656. Adjustment mechanism 644 is supported on frame 632 and is pivotably coupled to support arm 656. Movement of adjustment mechanism 646 in the direction of arrow 672 causes support arm 656 to pivot about pivot 660. This action causes support arm 656 to act on vertical support 696 to change the elevation of bearing end 666 of auger assembly 612. A control link 674 is pivotably coupled to frame 632 at a pin 676 and pivotably coupled to vertical support 696 at a pin 678. Control link 674 acts to limit the movement of the vertical support 696 to vertical movement so that the movement of adjustment mechanism 644 is directly proportional to movement of bearing end 666 of auger assembly 612.

Similarly, a pin 680 interconnects support anti 658 and a vertical support 682 so that vertical support 682 may pivot relative to support arm 658. Adjustment mechanism 646 is supported on frame 632 and is pivotably coupled to support arm 658. Movement of adjustment mechanism 646 in the direction of arrow 684 causes support arm 658 to pivot about pivot 662. This action causes support arm 658 to act on vertical support 682 to change the elevation of drive end 686 of auger assembly 612. A control link 688 is pivotably coupled to frame 632 at a pin 690 and pivotably coupled to vertical support 682 at a pin 692. Control link 688 acts to limit the movement of vertical support 682 to vertical movement so that the movement of the adjustment mechanism 646 is directly proportional to movement of drive end 686 of auger assembly 612.

A frame 694 supports receiver units 648 and 650. Receiver units 648 and 650 are connected to control system 642. Control system 642 is similar to control system 24 discussed with regard to the embodiment of FIG. 1 above. Control system 642 acts on the signals received from receiver units 648 and 650 to cause adjustment mechanisms 644 and 646 to adjust the vertical position of bearing end 666 and drive end 664 of auger assembly 612.

The invention claimed is:
1. A material-leveling system comprising
  a material-leveling assembly including a mobile-support frame and a material-leveling implement coupled to the mobile-support frame to move with the mobile-support frame relative to ground, and
  an automatic-leveling system including means for controlling movement of the material-leveling implement relative to a reference plane established by a grade laser so that a final-grade level of material is established in response to the material-leveling assembly moving through a work area, wherein the automatic-leveling system includes an implement-positioning system arranged to interconnect the material-leveling implement and the mobile-support frame to cause the material-leveling implement to move relative to the mobile-support frame, a sensor system coupled to the material-leveling implement to move therewith and configured to sense the grade laser, and a control system interconnecting the sensor system and the implement-positioning system to cause position signals received from the sensor system to be converted into movement commands that cause the material-leveling implement to move so that the final grade level is established in the work area, wherein the sensor system includes a first vertical-position receiver unit coupled to the material-leveling implement and a second vertical-position receiver unit coupled to the material-leveling implement in spaced-apart relation to the first vertical-position receiver unit and the first and second vertical-position receiver units are arranged to extend in an upward direction away from the material-leveling implement, wherein the sensor system further includes a rotational-position unit coupled to the implement-positioning system to move therewith and spaced-apart from the first and second vertical-position receivers units to cause a rotational position of the material-leveling implement to be sensed by the sensor system.

2. The material-leveling system of claim 1, wherein the implement-positioning system includes first and second height-adjustment mechanisms coupled the material-leveling implement to move up-and-down relative to the mobile-support frame and the material-leveling implement is coupled to the first and second height-adjustment mechanisms to move therewith.

3. The material-leveling system of claim 1, wherein the implement-positioning system includes a rotation-adjustment mechanism arranged to interconnect the material-leveling implement to the mobile-support frame to cause the material-leveling implement to move about an axis of rotation relative to the mobile-support frame.

4. The material-leveling system of claim 1, wherein the material-leveling implement includes a screed plate configured to remove excess uncured concrete from the work area to provide the final-grade level and to smooth concrete and a vibrator coupled to the screed plate to impart vibrations into the screed plate to work the concrete.

5. The material-leveling system of claim 1, wherein the material-leveling implement is a material rake adapted to move excess material from the work area to provide the final-grade level.

6. The material-leveling system of claim 1, wherein the material-leveling implement includes an auger and a power source coupled to the auger to cause an auger blade to rotate about an auger-rotation axis relative to the mobile-support frame.

7. The material-leveling system of claim 6, wherein the power source includes a motor having a rotational output configured to rotate about an axis of rotation and a rotary transmitter configured to transmit the rotational output of the motor to the auger and the auger-rotation axis is positioned to lie in spaced-apart generally parallel relation below the axis of rotation of the rotational output.

8. The material-leveling system of claim 1, wherein the mobile-support frame further includes a frame-implement coupler configured to provide means for separating selectively the mobile-support frame and the material-leveling implement without tools and for coupling selectively without tools the mobile-support fame and the material-leveling implant to establish a useable configuration of the material-leveling system.

9. The material-leveling system of claim 8, wherein the frame-implement coupler includes first and second mount arms, each of the first and second mount arms has a first end coupled to the mobile-support frame in a fixed position relative to the mobile support frame and an opposite second end, and first and second mount-arm receivers coupled to the material-leveling implement in spaced-apart relation to one another in a fixed position and the first and second mount-arm receivers are configured to mate with and receive the associated first and second mount arms to cause the material-leveling implement to move in response to movement of the mobile-support frame.

10. A material-leveling system comprising a material-leveling assembly including a mobile-support frame and a material-leveling implement coupled to the mobile-support frame to move with the mobile-support frame relative to ground, and an automatic-leveling system including means for controlling movement of the material-leveling implement relative to a reference plane established by a grade laser so that a final-grade level of material is established in response to the material-leveling assembly moving through a work area, wherein the automatic-leveling system includes an implement-positioning system arranged to interconnect the material-leveling implement and the mobile-support frame to cause the material-leveling implement to move relative to the mobile-support frame, a sensor system coupled to the material-leveling implement to move therewith and configured to sense the grade laser, and a control system interconnecting the sensor system and the implement-positioning system to cause position signals received from the sensor system to be converted into movement commands that cause the material-leveling implement to move so that the final grade level is established in the work area, wherein the sensor system further includes a rotational-position unit coupled to the implement-positioning system to move therewith to cause a rotational position of the material-leveling implement to be sensed by the sensor system.

11. The material-leveling system of claim 10, wherein the implement-positioning system includes a rotation-adjustment mechanism arranged to interconnect the material-leveling implement to the mobile-support frame to cause the material-leveling implement to move about an axis of rotation relative to the mobile-support frame in response to the a rotational position of the material-leveling implement to be sensed by the sensor system.

* * * * *